(12) United States Patent
Busby et al.

(10) Patent No.: US 9,208,965 B2
(45) Date of Patent: Dec. 8, 2015

(54) SWITCH COVER AND CONTROL FOR CONTROLLABLE LAMP

(71) Applicant: Centralite Systems, Inc., Mobile, AL (US)

(72) Inventors: James Barton Busby, Mobile, AL (US); James Louie Busby, Coden, AL (US); Leo John Calagaz, Mobile, AL (US); Sean Michael Bryant, Saraland, AL (US)

(73) Assignee: Centralite Systems, Inc., Mobile, AL (US)

( * ) Notice: Subject to any disclaimer, the term of this patent is extended or adjusted under 35 U.S.C. 154(b) by 0 days.

(21) Appl. No.: 14/446,368

(22) Filed: Jul. 30, 2014

(65) Prior Publication Data
US 2015/0043194 A1 Feb. 12, 2015

Related U.S. Application Data

(60) Provisional application No. 61/862,932, filed on Aug. 6, 2013.

(51) Int. Cl.
F21V 33/00 (2006.01)
H01H 9/28 (2006.01)
H02G 3/14 (2006.01)

(52) U.S. Cl.
CPC ........ *H01H 9/287* (2013.01); *H02G 3/14* (2013.01)

(58) Field of Classification Search
CPC ........ H01H 9/287; H02G 3/14; H05B 37/0272
USPC .......................................................... 362/95
See application file for complete search history.

(56) References Cited

U.S. PATENT DOCUMENTS

2006/0072302 A1* 4/2006 Chien .............................. 362/84
2015/0109721 A1* 4/2015 Willcocks et al. ........ 361/679.01

* cited by examiner

*Primary Examiner* — Vip Patel
(74) *Attorney, Agent, or Firm* — Robert J. Veal; Veal Intellectual Property

(57) ABSTRACT

An apparatus to cover the original wall switch controlling the lighting fixtures which now contain the wireless lamps such that a user cannot interrupt power to the lighting fixture by inadvertently changing the setting the wall switch.

9 Claims, 7 Drawing Sheets

SWITCH COVER AND CONTROL FOR CONTROLLABLE LAMP

BACKGROUND OF THE INVENTION

The present invention relates to the field of lighting for buildings and control thereof wherein wireless lamps or bulbs are used.

Specifically, wireless bulbs refer to devices such as disclosed in U.S. Pat. No. 6,759,966 which covered a wireless remote control bulb with a remote control receiver installed in the bulb and responsive to a remote control transmitter. Such bulbs now include a variety of features such as may be seen in U.S. Pat. No. 7,988,323 and Published Application No. U.S. 2012/0274211 as well as a number of devices currently marketed. These bulbs can be used in virtually any receptacle, a conventional light bulb can be used in and draw their power from the line wiring of the structure. However, a key feature of the wireless lamps is their ability to be controlled from devices other than the wall switch, such as smart phones, computers, or other remote controls. If power is cut to the wireless lamps they are not be able to respond to commands from these other control devices.

A need exists to insure that the power remains on at the receptacle such that these bulbs may be controlled. It is obvious that each associated light switch in an existing home could be rewired, however, rewiring of each switch is a job for an electrician or a building owner willing to risk a faulty rewiring job by someone less competent than an electrician. This makes utilization of these advanced technology bulbs in existing homes and building much more expensive than merely purchasing an installing the bulbs, or much more frustrating when the power has been turned off at the switch and the bulb cannot be made to operate from the remote control.

SUMMARY OF THE PRESENT INVENTION

It is an object of the present invention to maintain the power setting on the wall switch associated with a receptacle circuit.

Another object is to allow the user to still have control of the wireless lamps from the same traditional location, the light switch, while also preventing power from being cut of to the wireless lamps.

Yet another object of the invention is to allow a building owner to install and fully utilize wireless bulbs without any electrical rewiring, thus negating the and expense of integration into line voltage circuits, while maintaining power to the receptacles and control from the traditional switch location.

Still another object of the invention is to provide the ability to control smart bulbs and other wirelessly controllable lighting and home automation products at traditional light switch point-of-use.

Yet another advantage of the present invention is that it locks out the user from inadvertently turning wired switch off.

These and other objects and advantages of the invention will become apparent from the following detailed description of the preferred embodiment of the invention.

BRIEF DESCRIPTION OF THE DRAWINGS

Our switch cover and control for controllable lamps is depicted the accompanying drawings which form a portion of this disclosure and wherein.

DESCRIPTION OF THE PREFERRED EMBODIMENT

Referring to the FIGS. 1-17 for a clearer understanding of the invention, it may be seen that the preferred embodiments of the invention allow the user to still have control of the wireless lamps from the same traditional location, the wall switch, while also preventing power from being cut off to the wireless lamps.

Figure 1:
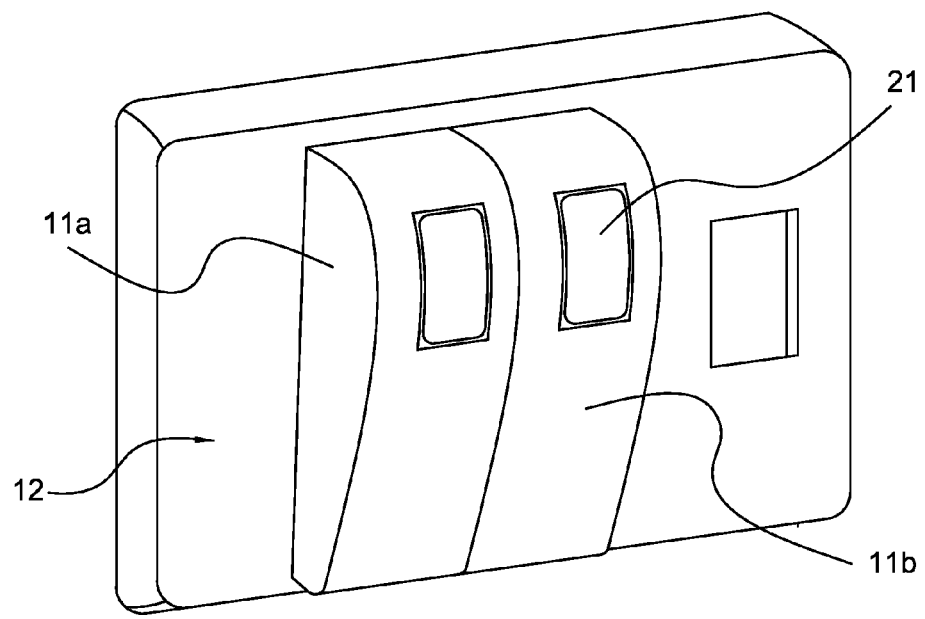
FIG. 1 is a perspective view of two switch covers in accordance with one embodiment of the invention mounted to an existing wall plate.

As may be seen in FIG. 1, a housing 11 may be positioned to over the original wall switch controlling the lighting fixtures which now contain the wireless lamps such that a user cannot interrupt power to the lighting fixture by inadvertently moving the wall switch. To facilitate the product's ability to act as a wireless control for the wireless lamps the housing mounts a radio controller therewithin for sending control signals to the wireless lamps via a manual control button engaged with the radio circuit. Depending on the controller used, control can be on/off, dimming, or variable color.

The invention is designed such that it exists totally outside of the wall switch enclosure. This allows for easy installation, requiring no access to the electrical components behind the wall plate and a uniform structure that can be all affixed to each switch. In one embodiment, the present invention uses an adapter bracket that is compatible with numerous styles of in-wall switches, including: On/Off Switches such as toggle (traditional) (including 3-way and multi-way variants), rocker (alternatively known as Decora™), multiple variants of electronic switches (e.g., keypads, digital switches, occupancy sensing switches, push-button switches), and key locking; and dimming switches, such as rotary dimmers (supports those with a removable "wheel"), slide dimmers, digital dimmers (e.g. those with push-button, keypad, or capacitive touch interlaces), and step dimmers.

Referring to FIG. 1, it may be seen that two standard switches are covered by separate units 11a and 11b of an embodiment of the invention with wall plate 12 remaining intact. It will be noted that the specific shape of the embodiments shown is not material to the function of the invention and many embodiments bearing aesthetically pleasing shapes maybe used.

Figure 2:
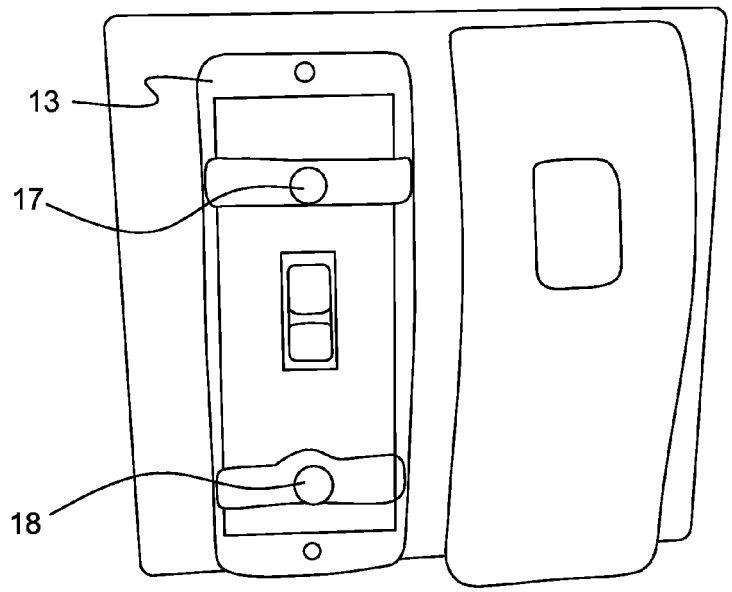
FIG. 2 is a front elevation view of the wall plate shown in FIG 1 with one of the switch covers displaced to show its mounting bracket.
Figure 3:
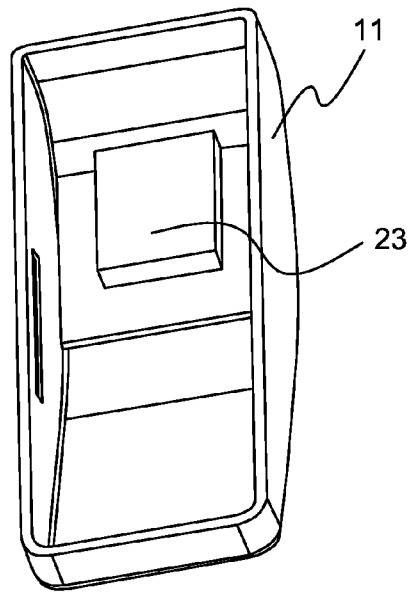
FIG. 3 is a perspective view of one embodiment of the invention showing the interior and a radio control module mounted therein.
Figure 4:
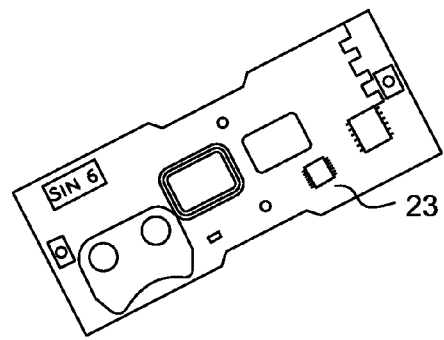
FIG. 4 is a pictorial illustration of a controller suitable for use in the present invention.
Figure 7:
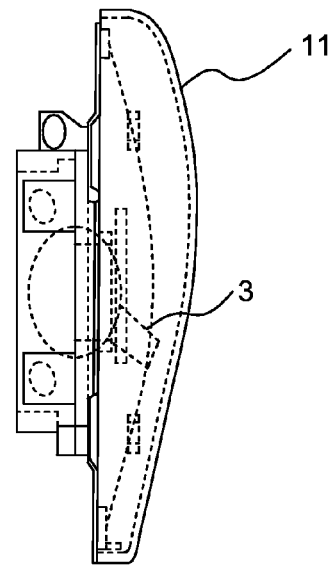
FIG. 7 is a side devotional view of an embodiment of a housing showing internal features in dotted line and in position on an associated switch assembly.
Figure 8:
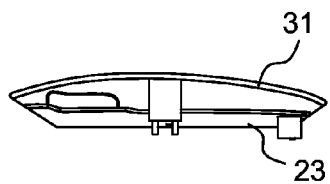
FIG. 8 is a perspective view of the interior of the cover showing electronic control module positioned adjacent the depressible switch.
Figure 9:
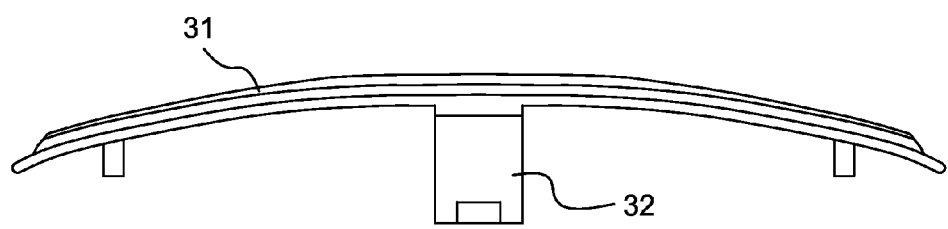
FIG. 9 is a side elevational view of an actuator in another embodiment of the invention.
Figure 10:
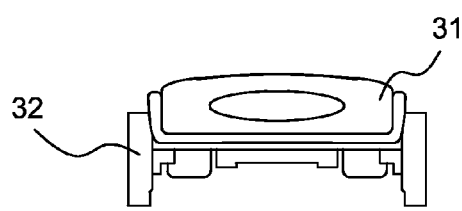
FIG. 10 is an end view of the actuator of this embodiment.
Figure 11:
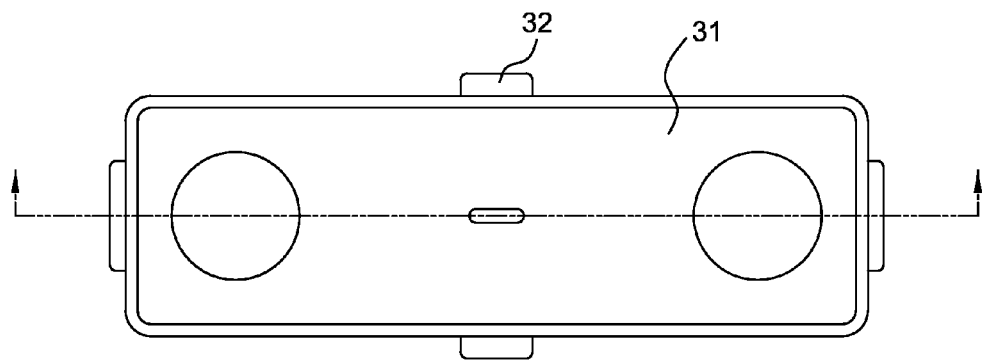
FIG. 11 is a top view of the actuator of this embodiment.
Figure 12:
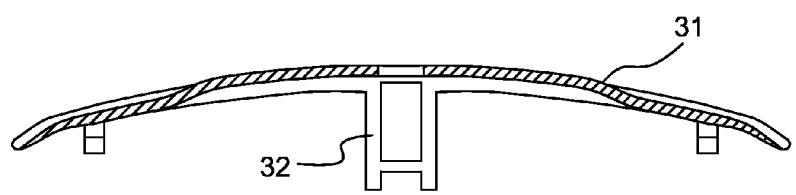
FIG. 12 is a section view of the actuator of this embodiment.
Figure 13:
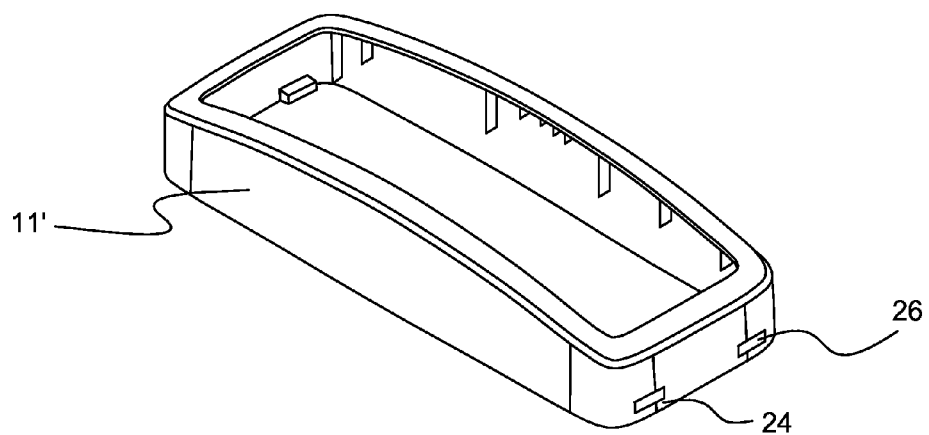
FIG. 13 is a perspective view of the housing of this embodiment.

As may be seen in FIG. 2 the embodiment shown includes a mounting bracket 13 having apertures therein designed to accept mounting bolts 17 and 18 which pass through the mounting holes in existing wall plates 12 to engage the underlying female mounting receptacle in an existing switch assembly, shown in FIG. 7, as would standard wall plate mounting bolts. Bracket 13 has been designed to be easily installed on and to "lockout" a wide range of existing in-wall switch variants. Preferentially, the housing will extend from the wall plate 12 only so far as necessary to enclose the existing wall switch and allow for the internal components of the device to fit within it. The housing 11 or cover portion snaps onto the bracket with the wall switch in the desired position. With the cover in position the wall switch cannot be accidently moved to the opposite position. Thus, when it is desired to maintain an electrical connection to the fixture in which a controllable lamp is installed, the cover can be placed over the associated wall switch with the wall switch in the "on" position. The lamp may then be remotely controlled.

Figure 5:
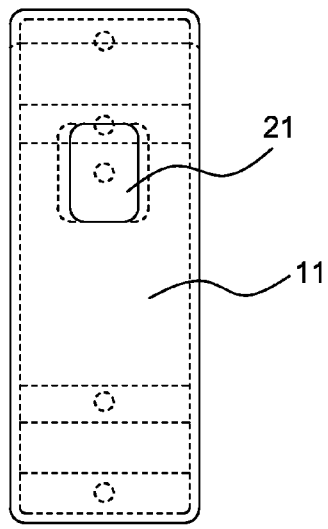
FIG. 5 is a front elevational view of an embodiment of a housing showing internal features in dotted line.
Figure 6:
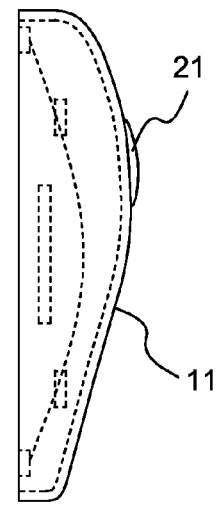
FIG. 6 is a side elevational view of an embodiment of a housing showing internal features in dotted line.

Referring to FIGS. 2, 5 and 6, it may be seen that the cover 11 has one or more depressible buttons 21 formed on it and in cooperative position with a radio controller 23 that allows "manual" operation of the lamp wireless lamp. That is to say, depressing button 21 causes the controller 23 to turn the wireless bulb on or off, however, the radio controller 23 does not interrupt the electrical connection at the wall switch thus other devices may still be used to control the lamp. In the Figures, it will be noted that controller 23 is a Controller available from Centralite Systems, Inc., however, any suitable controller for use with the wireless bulb which is also sized to be mounted within housing 11 and engaged by button 21 may be substituted. Such controllers are known to be utilized with other control devices, such as hand held devices or remote computer stations to control the individual bulbs within a room in any manner desired by the user. Controller 23 has its own power supply and is not wired to the building circuitry. Controller 23 may be powered by a regular battery, a rechargeable battery and a means to self-regenerate itself by means of a solar cell, wireless power, electromechanical generation such as a push button generator, or induction coil "power stealing" off the in-wall line. Consequently, no electrical connections in the existing circuitry are altered and wall plate 12 does not even have to be removed to install the control for the wireless bulb.

The Figures show the various components of the device which may be ascetically shaped in any desired exterior configuration. FIGS. 5 through 7 show an exemplary embodiment of the cover which may be made from plastic and may have end walls and side walls connected to a face portion on which button 21 is supported. The internal gusseting and support structure necessary to give the housing sufficient strength is shown in dotted line and may be of any configuration necessary. The product may be made plastic, metal, composite or any other suitable material and manufactured by any process that results in suitable protection and durability such that the product will stay affixed to its mounting bracket and endure repeated actuations of button 21 by users turning the associate light on or off.

Figure 14:
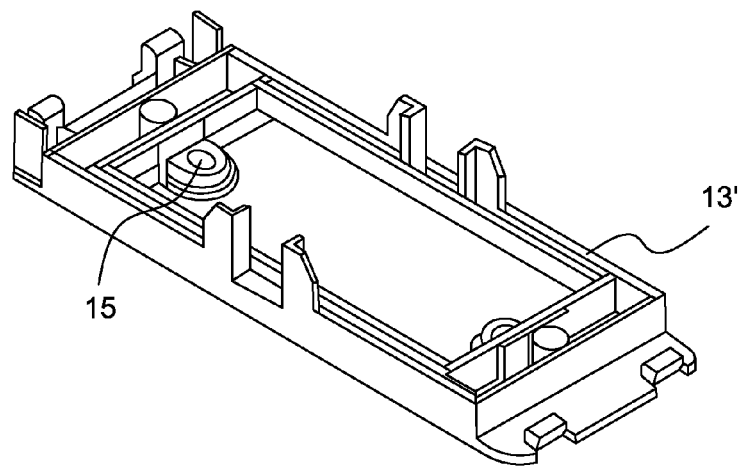
FIG. 14 is an alternative embodiment of the bracket.
Figure 15:
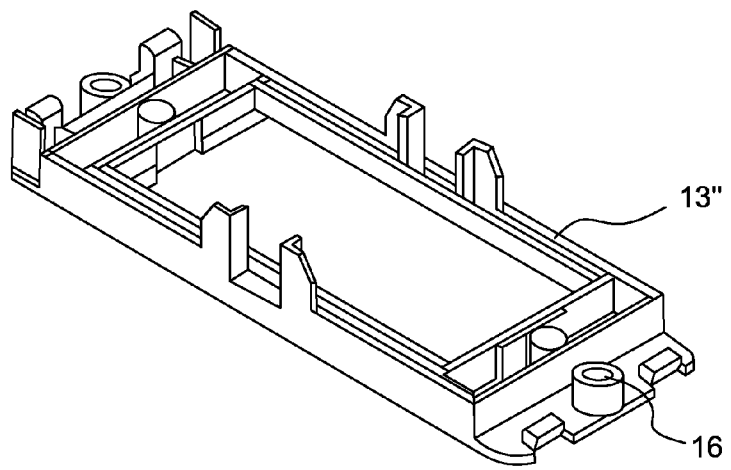
FIG. 15 is another embodiment of the bracket.

FIGS. 9 through 15 show another embodiment in which housing 11' is received on bracket 13' with snap connections 24 and 26 and actuator 31 is mounted within housing 11' on legs 32 to engage bracket 13'. The radio controller 23' is shown in the figures to be located within the housing 11' and associated with the face plate. In FIGS. 14 and 15 alternate brackets 13' and 13" are shown to illustrate that the bracket may be adjusted to accommodate a variety of switch types as noted above. Additionally a universal bracket may be provided to accommodate both toggle and rocker switches. The brackets receive mounting bolts 17 and 18 through apertures 15 and 16 which may be located as needed.

Figure 16:
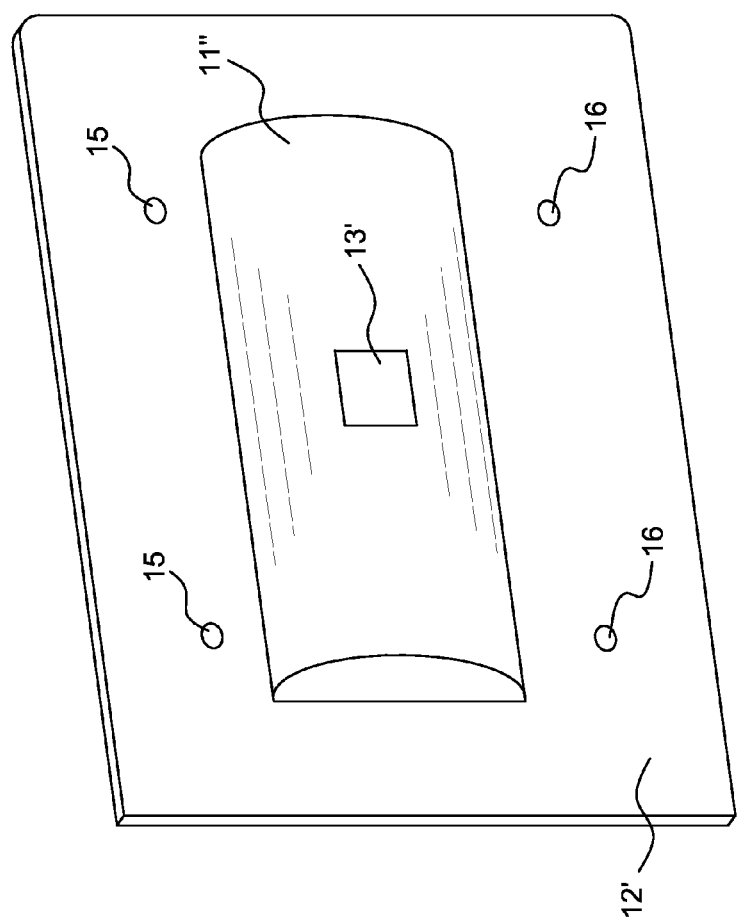
FIG. 16 is a perspective view of another embodiment.
Figure 17:
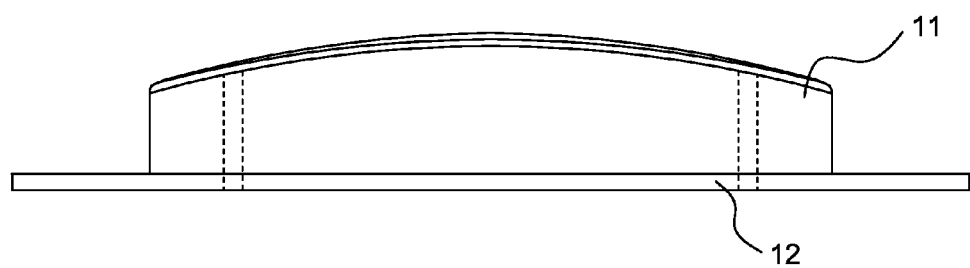
FIG. 17 is a side elevation view of still another embodiment.

In another embodiment, illustrated in FIG. 16, the housing 11" may be integral with the wall plate 12' such that no bracket is necessary and bolts 17 and 18 connect the housing directly to the switch assembly through apertures 15 and 16. In yet another embodiment as illustrated in FIG. 17, the bracket 13 can be eliminated and the housing 11' can be attached directly to the switch assembly using bolts 17 and 18 passing through the mounting holes of the existing wail plate 12 and the housing 11'. In yet another embodiment, the bracket 13 can be formed on the wall plate and the housing 11 may be releasably engaged thereon.

It is to be understood that the forms of the invention shown are preferred embodiments thereof and that various changes and modifications may be made therein without departing from the spirit of the invention or scope as defined in the following claims.

What is claimed is:

1. An apparatus for preventing the inadvertent disconnection of a controllable lamp which is connected to a conventional wall switch assembly in a building circuit, comprising:

A cover configured to be attached to said wall switch assembly with no electrical connection thereto to prevent inadvertent access to said wall switch;

A wireless controller for controlling said lamp, mounted within said cover; and, A region on said cover proximal said wireless controller responsive to a touch of a user to actuate said wireless controller which in turn controls and associated lamp without interrupting electrical supply thereto via the wall switch assembly.

2. The apparatus as defined in claim 1 further comprising a bracket mounted to said wall switch assembly and configured to releasably receive said cover thereon.

3. The apparatus as defined in claim 2 wherein said cover extends from said mounting bracket a sufficient distance to fully enclose an existing wall switch such that the wall switch cannot be accessed with said cover engaged with said bracket.

4. The apparatus as defined in claim 2 wherein said bracket is attached to said switch assembly by screws passing through a wall plate.

5. The apparatus as defined in claim 1 wherein said cover is attached to said switch assembly by screws passing through a wall plate.

6. The apparatus as defined in claim 5 wherein, said cover extends from said wall plate a sufficient distance to fully enclose an existing wall switch such that the wall switch cannot he accessed with said cover engaged with said bracket.

7. The apparatus as defined in claim 1 wherein said cover is formed integrally with a wall plate and is mounted to said switch assembly with screws passing therethrough.

8. The apparatus as defined in claim 1 wherein a wall plate is affixed to said switch assembly and wherein, said cover is releasably engaged on said wall plate to cover said switch assembly.

9. The apparatus as defined in claim 1 wherein said wireless controller utilizes radio signals to actuate said bulb.

\* \* \* \* \*